(12) United States Patent
Glass et al.

(10) Patent No.: US 11,556,712 B2
(45) Date of Patent: Jan. 17, 2023

(54) SPAN SELECTION TRAINING FOR NATURAL LANGUAGE PROCESSING

(71) Applicant: INTERNATIONAL BUSINESS MACHINES CORPORATION, Armonk, NY (US)

(72) Inventors: Michael R. Glass, Bayonne, NJ (US); Alfio Massimiliano Gliozzo, Brooklyn, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 536 days.

(21) Appl. No.: 16/595,888

(22) Filed: Oct. 8, 2019

(65) Prior Publication Data

US 2021/0103775 A1 Apr. 8, 2021

(51) Int. Cl.
*G06F 40/30* (2020.01)
*G06K 9/62* (2022.01)
*G06N 20/00* (2019.01)
*G06F 40/284* (2020.01)
*G06F 40/56* (2020.01)

(52) U.S. Cl.
CPC ............ *G06F 40/30* (2020.01); *G06F 40/284* (2020.01); *G06F 40/56* (2020.01); *G06K 9/623* (2013.01); *G06K 9/6257* (2013.01); *G06N 20/00* (2019.01)

(58) Field of Classification Search
None
See application file for complete search history.

(56) References Cited

U.S. PATENT DOCUMENTS

2021/0248268 A1* 8/2021 Ardhanari ............. G06F 21/602

FOREIGN PATENT DOCUMENTS

CN 110414004 A * 11/2019

OTHER PUBLICATIONS

Mandar Joshi et al., "SpanBERT: Improving Pre-training by Representing and Predicting Spans", arXiv:1907.10529v1 [cs.CL], Jul. 2019 (Year: 2019).*
Anonymous, "Span Selection Pre-training for Language Understanding", ACL submission, Jul. 2019.
Diego Collarana et al., "A Question Answering System on Regulatory Documents", Proceedings of the 31st international conference on Legal Knowledge and Information Systems (JURIX), Sep. 2018.
Jacob Devlin et al.,"BERT: Pre-training of Deep Bidirectional Transformers for Language Understanding", arXiv:1810.04805v1 [cs.CL], Oct. 2018.
Bhuwan Dhingra et al., "Simple and Effective Semi-Supervised Question Answering", arXiv:1804.00720v1 [cs.CL], Apr. 2018.

(Continued)

*Primary Examiner* — Antim G Shah
(74) *Attorney, Agent, or Firm* — Tutunjian & Bitetto, P.C.; Stosch Sabo (57) ABSTRACT

Methods and systems for natural language processing include pretraining a machine learning model that is based on a bidirectional encoder representations from transformers model, using a span selection training data set that associates a masked word with a passage. A natural language processing task is performed using the span selection pretrained machine learning model.

14 Claims, 7 Drawing Sheets

(56) References Cited

OTHER PUBLICATIONS

Peter Dun et al., "Extending Answer Prediction for Deep Bi-directional Transformers", 32nd Conference on Neural Information Processing Systems, Montréal, Canada, Dec. 2018.
Karl Mortiz Hermann et al., "Teaching Machines to Read and Comprehend", arXiv.org > cs > arXiv:1506.03340, Jun. 2015.
Takeshi Onishi et al., "Who did What: A Large-Scale Person-Centered Cloze Dataset", arXiv:1608.05457v1 [cs.CL], Aug. 2016.
Mrinmaya Sachan et al., "Self-Training for Jointly Learning to Ask and Answer Questions", Proceedings of NAACL-HLT 2018, pp. 629-640New Orleans, Louisiana, Jun. 2018.
Ashish Vaswani et al., "Attention Is All You Need", 31st Conference on Neural Information Processing Systems, Long Beach, CA, Dec. 2017.
Oriol Vinyals et al., "Matching Networks for One Shot Learning", arXiv:1606.04080v2 [cs.LG], Dec. 2017.
Yang Yu et al., "End-to-End Answer Chunk Extraction and Ranking for Reading Comprehension", arXiv:1610 09996v2 [cs.CL], Nov. 2016.
Grace Period Disclosure: Glass et al., "Span selection pre-training for question answering", arXiv preprint arXiv:1909.04120, Sep. 9, 2019, pp. 1-11.

\* cited by examiner

SPAN SELECTION TRAINING FOR NATURAL LANGUAGE PROCESSING

STATEMENT REGARDING PRIOR DISCLOSURES BY THE INVENTOR OR A JOINT INVENTOR

The following disclosure(s) are submitted under 35 U.S.C. § 102(b)(1)(A):

DISCLOSURE(S): Span Selection Pre-training for Question Answering, by Michael Glass et al., published Sep. 9, 2019.

BACKGROUND

The present invention generally relates to natural language processing and, more particularly, to extended span selection training for natural language processing systems that use bidirectional encoder representations from transformers (BERT).

Transformers are an approach to machine learning that are applied to sequence-to-sequence machine learning tasks that focus heavily on attention-based processes. In Transformer-based machine learning systems, an attention mechanism determines which parts of an input sequence are important.

SUMMARY

A method for natural language processing includes pre-training a machine learning model that is based on a bidirectional encoder representations from transformers model, using a span selection training data set that associates a masked word with a passage. A natural language processing task is performed using the span selection pretrained machine learning model.

A system for natural language processing includes a model pretrainer configured to pretrain a machine learning model that is based on a bidirectional encoder representations from transformers model, using a span selection training data set that associates a masked word with a passage. A natural language processor is configured to perform a natural language processing task using the span selection pretrained machine learning model.

These and other features and advantages will become apparent from the following detailed description of illustrative embodiments thereof, which is to be read in connection with the accompanying drawings.

BRIEF DESCRIPTION OF THE DRAWINGS

The following description will provide details of preferred embodiments with reference to the following figures wherein.

DETAILED DESCRIPTION

Embodiments of the present invention provide enhanced training to natural language processing models based on bidirectional encoder representations from transformers (BERT). The present embodiments add a training phase that uses span selection to generate a set of training data that provides an improvement to the performance of BERT models that are trained for a variety of natural language processing tasks.

BERT extends transformers by providing bidirectional training. Rather than handling the sequences in a left-to-right or right-to-left fashion, BERT processes sequences in a way that removes the sequential dependency of the information. In particular, for a given sentence, represented as a string of words, BERT will train the transformer model using a masked form of the sentence, where a word is removed and replaced by a placeholder. The training captures the dependence between the masked word and all of the other words in the sequence, without special focus on whether the sequence is considered in a "forward" or "backward" direction.

While transformers and BERT provide good performance across a variety of tasks, their performance can still be improved for certain natural language tasks. Such tasks include, for example, question-and-answer systems, word prediction, and next sentence prediction.

As contrasted to conventional BERT pretraining, which includes only multi-wordpiece cloze and next sentence prediction, the present embodiments supplement the pretraining with a span selection pretraining task. When generating a set of training data for span selection, an input sentence is masked, with an "answer" term being removed and replaced by a placeholder. The answer term can be selected from the sentence at random. A set of related passages are selected by looking for passages that are similar to the masked sentence (e.g., similarity that is measured while omitting the answer term). The set of related passages can be ranked according to a degree of similarity to the masked input sentence. The highest-ranked passage from the set that includes the answer term is selected. The masked sentence and the selected passage are then used as an element of a training data set. During training, in addition to, or instead of, the multi-wordpiece cloze and the next sentence prediction, the span selection training data set is used to provide further training of the BERT model.

Unlike multi-wordpiece cloze prediction, which masks only a single word in an input sentence, span selection can predict an entire multi-word term. Unlike next sentence prediction, attention on the two sequences addresses a semantic completion task, distinct from the pursuit of topic or discourse coherency. In tasks such as Stanford Question Answering Dataset (SQuAD), the start position and end position prediction of the BERT model can also be pre-trained.

Figure 1:
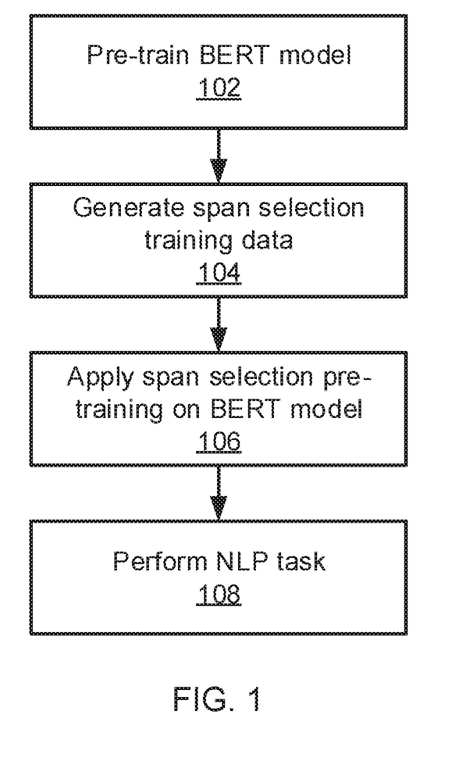
FIG. 1 is a block/flow diagram of a method for training a machine learning model using span selection and performing a natural language processing task in accordance with an embodiment of the present invention.

Referring now to FIG. 1, a method of performing a natural language processing (NLP) task is shown. Block 102 pretrains a BERT model, for example using multi-wordpiece cloze and next sentence prediction training sets. Although a BERT model is specifically contemplated, it should be understood that span selection pretraining can be used in any appropriate machine learning model, particularly those directed to bidirectional natural language tasks.

Block 102 can use any appropriate pre-training process beyond just multi-wordpiece doze and next sentence prediction. Regardless of the type of training, the training data sets will general include an input portion and an output portion, where the output portion reflects an expected result when the machine learning model is used on the input portion. The paired input and output portions can be split into further portions, with a training portion being used to perform training of the neural network and with a verification portion being used to verify the accuracy of the trained neural network.

Block 104 generates span selection training data. It should be noted that, in some embodiments, the generation of the span selection training data can happen well in advance of the pre-training of block 102. In some embodiments, the span selection data can be provided by a third party. It is specifically contemplated that the span selection data can be generated from a text corpus, but it should be understood that any source of training data can be used instead. Additional detail on this step is provided below.

Block 106 uses the span selection training data to pretrain the machine learning model. This can be performed using any training mechanism appropriate to the machine learning model, such as backpropagation. In some embodiments, the span selection training can be performed alongside other types of pretraining, for example using training tasks such as next sentence prediction or masked LM. In other embodiments, span selection training can be performed, on a transformer model that has already been pretrained on other tasks, using a task such as predicting the beginning and ending character of the masked portion of an input sentence. Optionally, block 106 can additionally include fine-tuning based on downstream tasks such as reading comprehension tasks, paraphrasing tasks, and question paraphrasing tasks. Once the machine learning model has been trained, it can be used on new sets of input data to perform natural language processing tasks (e.g., the task used for fine-tuning) in block 108.

When tested in a variety of different NLP scenarios, the present embodiments provide a trained model that performs better than BERT models with only the standard pretraining. As shown in Table 1, performing additional training on a BERT model using span selection (SS) provides superior results in SQuAD 1.1, SQuAD 2.0, and MICROSOFT® Research Paraphrase Corpus (MRPC) tasks.

TABLE 1

| Task | Model | F1 | Exact Match |
| --- | --- | --- | --- |
| SQuAD 1.1 | BERT | 88.524 | 81.220 |
| SQuAD 1.1 | BERT + SS | 90.138 | 83.141 |
| SQuAD 2.0 | BERT | 76.436 | 73.478 |
| SQuAD 2.0 | BERT + SS | 78.432 | 75.769 |
| MRPC | BERT | 84.804 | |
| MRPC | BERT + ss | 86.765 | |

In Table 1, the "F1" column measures a degree of overlap between the system predicted answer and a known correct answer, while the "exact match" column simply checks whether the predicted answer is the same as the known correct answer. MRPC only has an accuracy measure, because it only predicts paraphrases.

Figure 2:
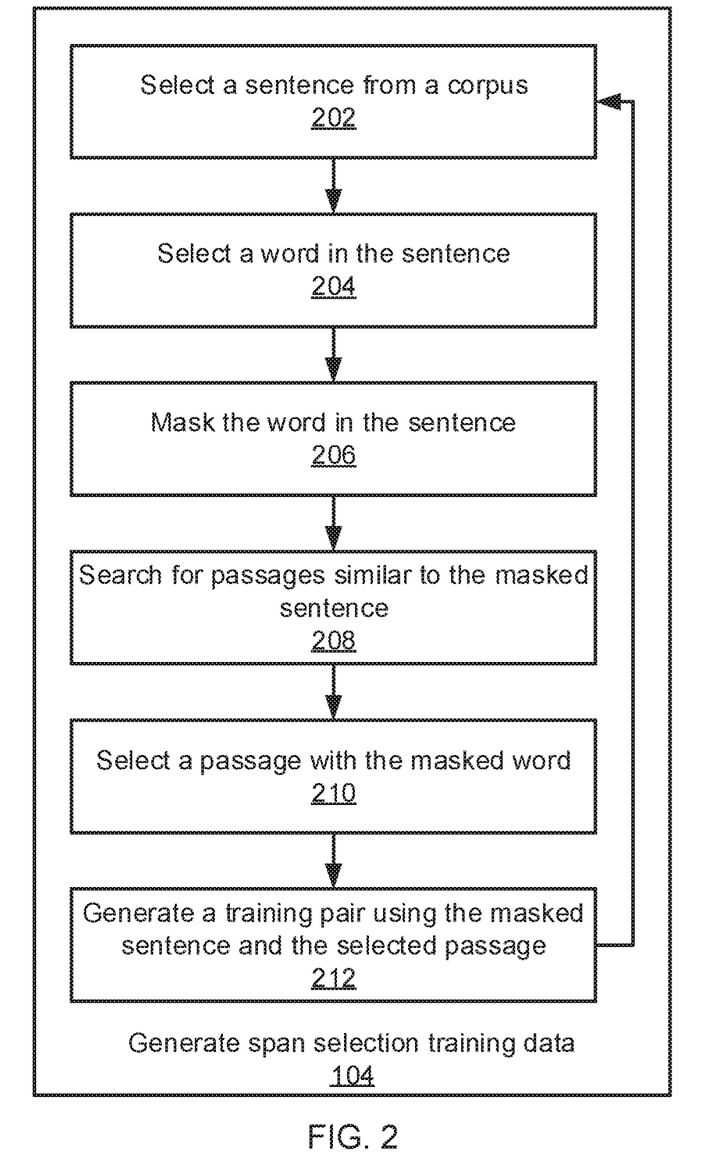
FIG. 2 is a block/flow diagram of a method for generating span selection training data to be used in training a machine learning model in accordance with an embodiment of the present invention.

Referring now to FIG. 2, additional detail on the generation of span selection training data in block 104 is shown. Block 202 selects a sentence from a text corpus. Any appropriately large corpus will suffice, including for example a publicly available online encyclopedia. In some embodiments, the selected corpus can depend on the application and so may have some domain knowledge dependency. For example, in an information technology support application, the corpus can be selected with a focus on computer hardware and software.

Block 204 selects a word or words from the sentence at random and block 206 masks the word(s). Block 206 can mask one or more, for example masking a single word 20% of the time and masking multiple consecutive words 80% of the time. Block 206 can furthermore use character length limits to establish, for example, a character length between four characters and thirty characters, though it should be understood that any appropriate range can be used instead. In some embodiments, the mask can encompass a noun phrase, including a noun and all of its modifiers. Masking can include removing the selected word from the sentence and replacing it with a placeholder.

Block 208 searches for passages in the corpus that are similar to the masked sentence. Any appropriate similarity measure can be used. The similarity is determined based on words in the sentence other than the masked word(s). In some embodiments, the similarity can be measured according to, e.g., term frequency inverse document frequency metrics, latent semantic indexing metrics, or neural network information retrieval. In latent semantic indexing, the masked sentence and candidate passages are represented as vectors in a latent space and the cosine similarity between them is measured. In neural network information retrieval, deep learning can be used to identify the similarities.

Block 210 then selects the passage that includes the masked word that is most similar to the masked sentence. The selected passage is paired with the masked sentence to form one element of training data. This process then repeats, for example millions of times, with a newly selected sentence and a newly selected passage, until a sufficient amount of training data has been generated.

In some embodiments, the machine learning model can be implemented as an artificial neural network (ANN). An ANN is an information processing system that is inspired by biological nervous systems, such as the brain. The key element of ANNs is the structure of the information processing system, which includes a large number of highly interconnected processing elements (called "neurons") working in parallel to solve specific problems. ANNs are furthermore trained in-use, with learning that involves adjustments to weights that exist between the neurons. An ANN is configured for a specific application, such as pattern recognition or data classification, through such a learning process.

Figure 3:
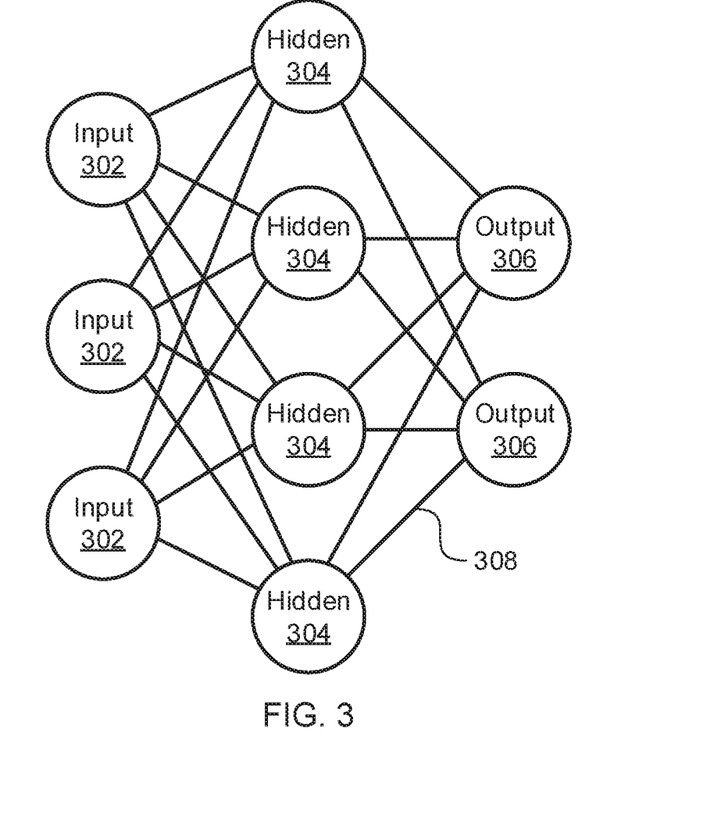
FIG. 3 is a block diagram of a general neural network in accordance with an embodiment of the present invention.

Referring now to FIG. 3, a generalized diagram of a neural network is shown. ANNs demonstrate an ability to derive meaning from complicated or imprecise data and can be used to extract patterns and detect trends that are too complex to be detected by humans or other computer-based systems. The structure of a neural network is known generally to have input neurons 302 that provide information to one or more "hidden" neurons 304. Connections 308 between the input neurons 302 and hidden neurons 304 are weighted and these weighted inputs are then processed by the hidden neurons 304 according to some function in the hidden neurons 304, with weighted connections 308 between the layers. There can be any number of layers of hidden neurons 304, and as well as neurons that perform different functions. There exist different neural network structures as well, such as convolutional neural network, maxout network, etc. Finally, a set of output neurons 306 accepts and processes weighted input from the last set of hidden neurons 304.

This represents a "feed-forward" computation, where information propagates from input neurons 302 to the output neurons 306. Upon completion of a feed-forward computation, the output is compared to a desired output available from training data. The error relative to the training data is then processed in "feed-back" computation, where the hidden neurons 304 and input neurons 302 receive information regarding the error propagating backward from the output neurons 306. Once the backward error propagation has been completed, weight updates are performed, with the weighted connections 308 being updated to account for the received error. This represents just one variety of ANN.

Figure 4:
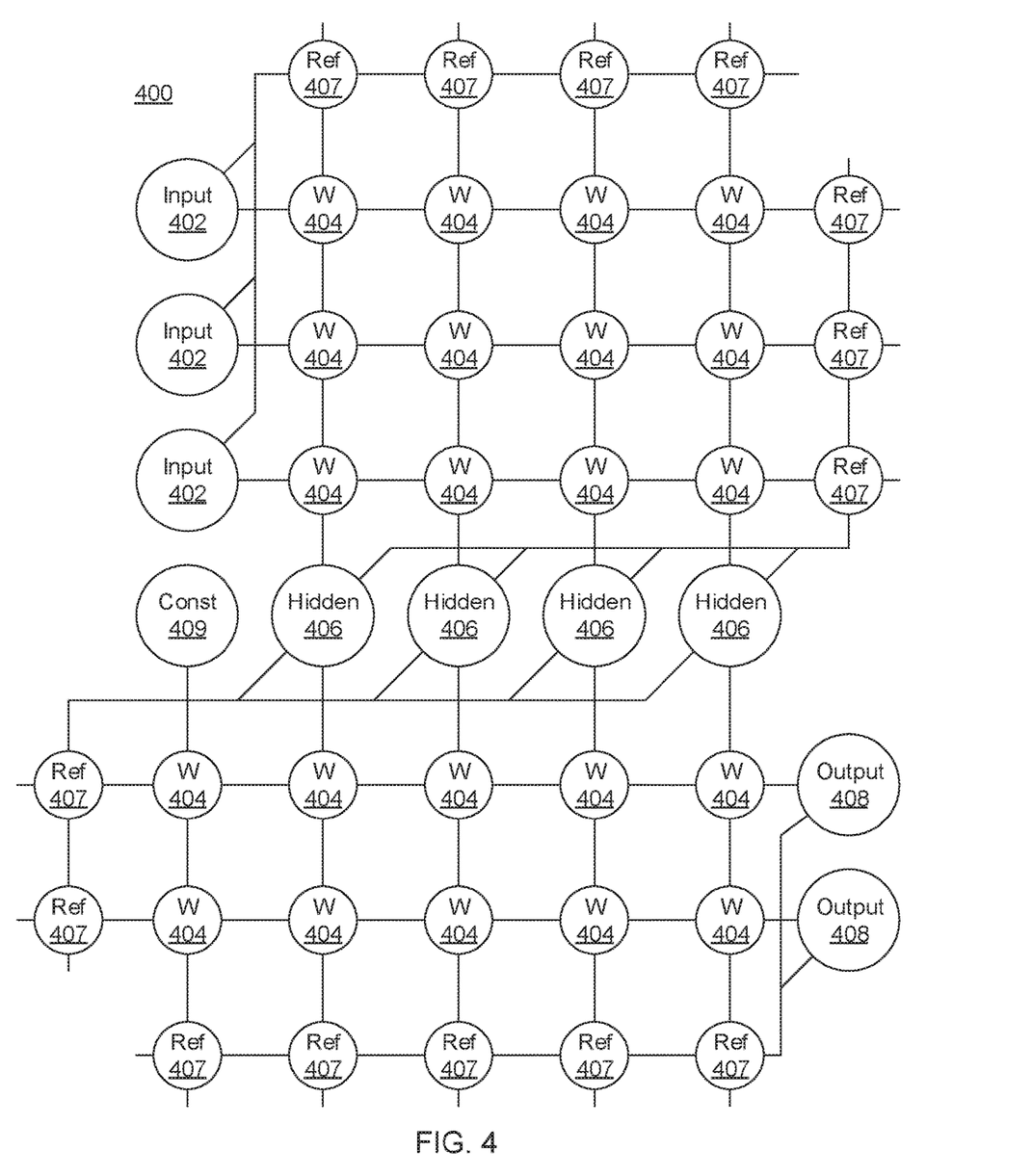
FIG. 4 is a block diagram of an exemplary neural network architecture in accordance with an embodiment of the present invention.

Referring now to the drawings in which like numerals represent the same or similar elements and initially to FIG. 4, an ANN architecture 400 is shown. It should be understood that the present architecture is purely exemplary and that other architectures or types of neural network can be used instead. In particular, while a hardware embodiment of an ANN is described herein, it should be understood that neural network architectures can be implemented or simulated in software. The hardware embodiment described herein is included with the intent of illustrating general principles of neural network computation at a high level of generality and should not be construed as limiting in any way.

Furthermore, the layers of neurons described below and the weights connecting them are described in a general manner and can be replaced by any type of neural network layers with any appropriate degree or type of interconnectivity. For example, layers can include convolutional layers, pooling layers, fully connected layers, softmax layers, or any other appropriate type of neural network layer. Furthermore, layers can be added or removed as needed and the weights can be omitted for more complicated forms of interconnection. In the present embodiments, the architecture can take the form of a BERT model, but it should be understood that any appropriate neural network model can be used instead.

During feed-forward operation, a set of input neurons 402 each provide an input voltage in parallel to a respective row of weights 404. In the hardware embodiment described herein, the weights 404 each have a settable resistance value, such that a current output flows from the weight 404 to a respective hidden neuron 406 to represent the weighted input. In software embodiments, the weights 404 can simply be represented as coefficient values that are multiplied against the relevant neuron outputs.

Following the hardware embodiment, the current output by a given weight 404 is determined as $$I = \frac{V}{r},$$

where V is the input voltage from the input neuron 402 and r is the set resistance of the weight 404. The current from each weight adds column-wise and flows to a hidden neuron 406. A set of reference weights 407 have a fixed resistance and combine their outputs into a reference current that is provided to each of the hidden neurons 406. Because conductance values can only be positive numbers, some reference conductance is needed to encode both positive and negative values in the matrix. The currents produced by the weights 404 are continuously valued and positive, and therefore the reference weights 407 are used to provide a reference current, above which currents are considered to have positive values and below which currents are considered to have negative values. The use of reference weights 407 is not needed in software embodiments, where the values of outputs and weights can be precisely and directly obtained. As an alternative to using the reference weights 407, another embodiment can use separate arrays of weights 404 to capture negative values.

The hidden neurons 406 use the currents from the array of weights 404 and the reference weights 407 to perform some calculation. The hidden neurons 406 then output a voltage of their own to another array of weights 404. This array performs in the same way, with a column of weights 404 receiving a voltage from their respective hidden neuron 406 to produce a weighted current output that adds row-wise and is provided to the output neuron 408.

It should be understood that any number of these stages can be implemented, by interposing additional layers of arrays and hidden neurons 406. It should also be noted that some neurons can be constant neurons 409, which provide a constant output to the array. The constant neurons 409 can be present among the input neurons 402 and/or hidden neurons 406 and are only used during feed-forward operation.

During back propagation, the output neurons 408 provide a voltage back across the array of weights 404. The output layer compares the generated network response to training data and computes an error. The error is applied to the array as a voltage pulse, where the height and/or duration of the pulse is modulated proportional to the error value. In this example, a row of weights 404 receives a voltage from a respective output neuron 408 in parallel and converts that voltage into a current which adds column-wise to provide an input to hidden neurons 406. The hidden neurons 406 combine the weighted feedback signal with a derivative of its feed-forward calculation and stores an error value before outputting a feedback signal voltage to its respective column of weights 404. This back propagation travels through the entire network 400 until all hidden neurons 406 and the input neurons 402 have stored an error value.

During weight updates, the input neurons 402 and hidden neurons 406 apply a first weight update voltage forward and the output neurons 408 and hidden neurons 406 apply a second weight update voltage backward through the network 400. The combinations of these voltages create a state change within each weight 404, causing the weight 404 to take on a new resistance value. In this manner the weights 404 can be trained to adapt the neural network 400 to errors in its processing. It should be noted that the three modes of operation, feed forward, back propagation, and weight update, do not overlap with one another.

As noted above, the weights 404 can be implemented in software or in hardware, for example using relatively complicated weighting circuitry or using resistive cross point devices. Such resistive devices can have switching characteristics that have a non-linearity that can be used for processing data. The weights 404 can belong to a class of device called a resistive processing unit (RPU), because their non-linear characteristics are used to perform calculations in the neural network 400. The RPU devices can be implemented with resistive random access memory (RRAM), phase change memory (PCM), programmable metallization cell (PMC) memory, or any other device that has non-linear resistive switching characteristics. Such RPU devices can also be considered as memristive systems.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

Reference in the specification to "one embodiment" or "an embodiment" of the present invention, as well as other variations thereof, means that a particular feature, structure, characteristic, and so forth described in connection with the embodiment is included in at least one embodiment of the present invention. Thus, the appearances of the phrase "in one embodiment" or "in an embodiment", as well any other variations, appearing in various places throughout the specification are not necessarily all referring to the same embodiment.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

As employed herein, the term "hardware processor subsystem" or "hardware processor" can refer to a processor, memory, software or combinations thereof that cooperate to perform one or more specific tasks. In useful embodiments, the hardware processor subsystem can include one or more data processing elements (e.g., logic circuits, processing circuits, instruction execution devices, etc.). The one or more data processing elements can be included in a central processing unit, a graphics processing unit, and/or a separate processor- or computing element-based controller (e.g., logic gates, etc.). The hardware processor subsystem can include one or more on-board memories (e.g., caches, dedicated memory arrays, read only memory, etc.). In some embodiments, the hardware processor subsystem can include one or more memories that can be on or off board or that can be dedicated for use by the hardware processor subsystem (e.g., ROM, RAM, basic input/output system (BIOS), etc.).

In some embodiments, the hardware processor subsystem can include and execute one or more software elements. The one or more software elements can include an operating system and/or one or more applications and/or specific code to achieve a specified result.

In other embodiments, the hardware processor subsystem can include dedicated, specialized circuitry that performs one or more electronic processing functions to achieve a specified result. Such circuitry can include one or more application-specific integrated circuits (ASICs), FPGAs, and/or PLAs.

These and other variations of a hardware processor subsystem are also contemplated in accordance with embodiments of the present invention.

Figure 5:
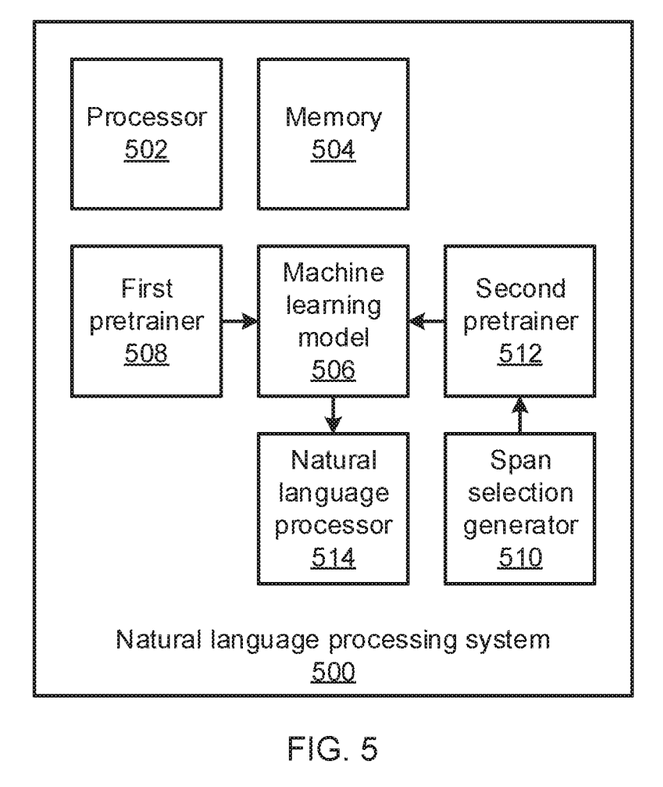
FIG. 5 is a block diagram of a natural language processing system that uses span selection training data in accordance with an embodiment of the present invention.

Referring now to FIG. 5, a natural language processing system 500 is shown. The system 500 includes a hardware processor 502 and a memory 504. A machine learning model 506 is implemented and may include, for example, a hardware or software embodiment of a BERT neural network. In software embodiments, the machine learning model 506 can be represented as, e.g., a software program that is stored in the memory 504 and that is executed by the processor 502. In hardware embodiments, the machine learning model 506 can be implemented as one or more discrete hardware components.

A first pretrainer 508 operates on the machine learning model 506 to pretrain the machine learning model 506 according to one or more pretraining tasks. In embodiments that use a BERT model, the first pretrainer 508 may train the machine learning model 506 using, e.g., multi-wordpiece cloze and next sentence prediction tasks, with corresponding training data sets being stored in the memory 504.

A span selection generator 510 generates a span selection training data set, for example in the manner described above. The span selection training data set can be stored in memory 504. A second pretrainer 512 trains the machine learning model 506 using the span selection training data set. This training can be done separately from the pretraining performed by the first pretrainer 508 or can, alternatively, be performed concurrently. Once the machine learning model 506 has been trained, a natural language processor 514 uses the machine learning model to perform a natural language processing task.

Figure 6:
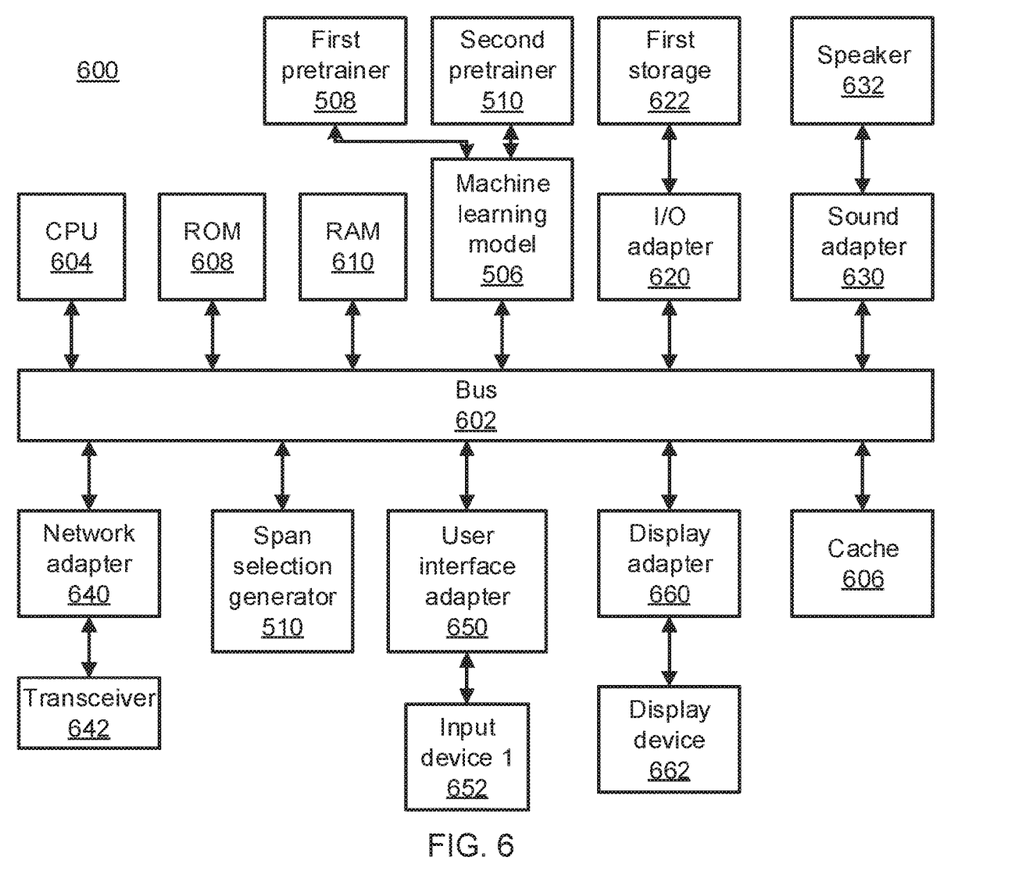
FIG. 6 is a block diagram of a processing system that can be used to implement the natural language processing system in accordance with an embodiment of the present invention.

Referring now to FIG. 6, an exemplary processing system 600 is shown which may represent the natural language processing system 500. The processing system 600 includes at least one processor (CPU) 604 operatively coupled to other components via a system bus 602. A cache 606, a Read Only Memory (ROM) 608, a Random Access Memory (RAM) 610, an input/output (I/O) adapter 620, a sound adapter 630, a network adapter 640, a user interface adapter 650, and a display adapter 660, are operatively coupled to the system bus 602.

A first storage device 622 is operatively coupled to system bus 602 by the I/O adapter 620. The storage device 622 can be any of a disk storage device (e.g., a magnetic or optical disk storage device), a solid state magnetic device, and so forth. The storage device 622 can be the same type of storage device or different types of storage devices.

A speaker 632 is operatively coupled to system bus 602 by the sound adapter 630. A transceiver 642 is operatively coupled to system bus 602 by network adapter 640. A display device 662 is operatively coupled to system bus 602 by display adapter 660.

A first user input device 652 is operatively coupled to system bus 602 by user interface adapter 650. The user input device 652 can be any of a keyboard, a mouse, a keypad, an image capture device, a motion sensing device, a microphone, a device incorporating the functionality of at least two of the preceding devices, and so forth. Of course, other types of input devices can also be used, while maintaining the spirit of the present principles. The user input device 622 can be the same type of user input device or different types of user input devices. The user input device 652 is used to input and output information to and from system 600.

Of course, the processing system 600 may also include other elements (not shown), as readily contemplated by one of skill in the art, as well as omit certain elements. For example, various other input devices and/or output devices can be included in processing system 600, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized as readily appreciated by one of ordinary skill in the art. These and other variations of the processing system 600 are readily contemplated by one of ordinary skill in the art given the teachings of the present principles provided herein.

Figure 7:
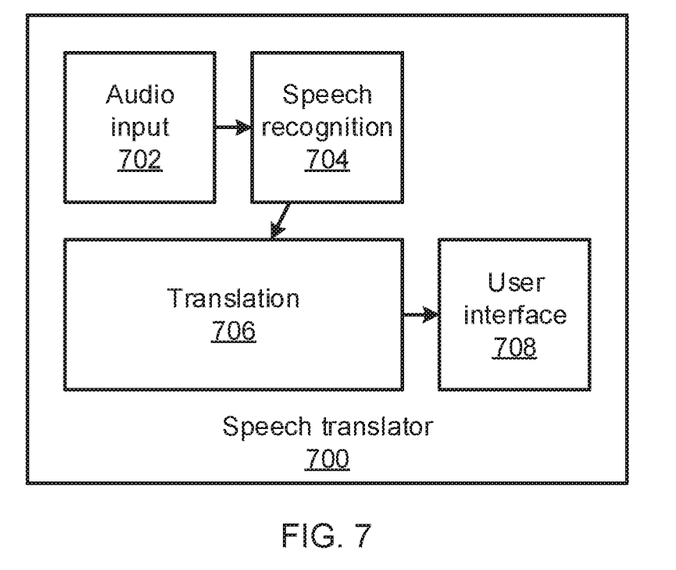
FIG. 7 is a block diagram of a speech translator that makes use of a natural language processing system in accordance with an embodiment of the present invention.

Referring now to FIG. 7, a diagram of an automated speech translator is shown. In this embodiment, an audio input 702 records sounds using, e.g., a microphone or other audio recording device. Block 704 performs speech recognition on the recorded audio input. It should be noted that, in some embodiments, block 704 can be performed using an appropriately trained natural language processing system 500, as described above. Block 706 then performs translation from a source language of the original speech to a target language. In some embodiments, block 706 can also be performed using an appropriately trained natural language system 500, as described above. A user interface 708 then outputs the translated speech, for example in text form or as synthesized audio.

Having described preferred embodiments of span selection training for natural language processing (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

What is claimed is:

1. A method for natural language processing, comprising:
generating elements of a span selection training data set by selecting a sentence in a text corpus and masking a portion of the selected sentence to remove multiple words from the selected sentence;
measuring a similarity between the masked selected sentence and each passage from a plurality of passages that include the masked portion using a similarity metric that is selected from the group consisting of term frequency inverse document frequency metrics, latent semantic indexing metrics, and neural network information retrieval;
pretraining a machine learning model that is based on a bidirectional encoder representations from transformers model, using a span selection training data set that associates a masked multi-word term with a passage; and
performing a natural language processing task using the span selection pretrained machine learning model.

2. The method of claim 1, further comprising pretraining the machine learning model using one or more pretraining tasks selected from the group consisting of multi-wordpiece cloze and next sentence prediction.

3. The method of claim 1, wherein generating the span selection training data set further includes selecting a plurality of passages from the text corpus that are similar to the masked sentence.

4. The method of claim 3, wherein generating the span selection training data set further includes selecting a most similar passage that includes the masked portion from the plurality of passages.

5. The method of claim 4, wherein generating the span selection training data set further includes pairing the masked sentence with the selected passage as one element of the span selection training data set.

6. The method of claim 1, wherein the multiple words are consecutive and have a total number of characters in a predetermined length range.

7. The method of claim 1, wherein masking the portion of the selected sentence comprises replacing the portion of the selected sentence with a placeholder that indicates a location where one or more words are removed.

8. A non-transitory computer readable storage medium comprising a computer readable program for natural language processing, wherein the computer readable program when executed on a computer causes the computer to perform the steps of:
generating elements of a span selection training data set by selecting a sentence in a text corpus and masking a portion of the selected sentence to remove multiple words from the selected sentence;
measuring a similarity between the masked selected sentence and each passage from a plurality of passages that include the masked portion using a similarity metric that is selected from the group consisting of term frequency inverse document frequency metrics, latent semantic indexing metrics, and neural network information retrieval;
pretraining a machine learning model that is based on a bidirectional encoder representations from transformers model, using a span selection training data set that associates a masked multi-word term with a passage; and
performing a natural language processing task using the span selection pretrained machine learning model.

9. A system for natural language processing, comprising:
a span selection generator configured to select a sentence in a text corpus, to mask a portion of the selected sentence to remove multiple words from the selected sentence, to measure a similarity between the masked selected sentence and each passage from a plurality of passages that include the masked portion using a similarity metric that is selected from the group consisting of term frequency inverse document frequency metrics, latent semantic indexing metrics, and neural network information retrieval;
a model pretrainer configured to pretrain a machine learning model that is based on a bidirectional encoder representations from transformers model, using a span selection training data set that associates a masked multi-word term with a passage; and
a natural language processor configured to perform a natural language processing task using the span selection pretrained machine learning model.

10. The system of claim 9, further wherein the model pretrainer is further configured to pretrain the machine learning model using one or more pretraining tasks selected from the group consisting of multi-wordpiece cloze and next sentence prediction.

11. The system of claim 9, wherein the span selection generator is further configured to select a plurality of passages from the text corpus that are similar to the masked sentence.

12. The system of claim 11, wherein the span selection generator is further configured to select a most similar passage that includes the masked portion from the plurality of passages.

13. The system of claim 12, wherein the span selection generator is further configured to pair the masked sentence with the selected passage as one element of the span selection training data set.

14. The system of claim 12, wherein the multiple words are consecutive and have a total number of characters in a predetermined length range that indicates a location where one or more words are removed.

* * * * *